UNITED STATES PATENT OFFICE.

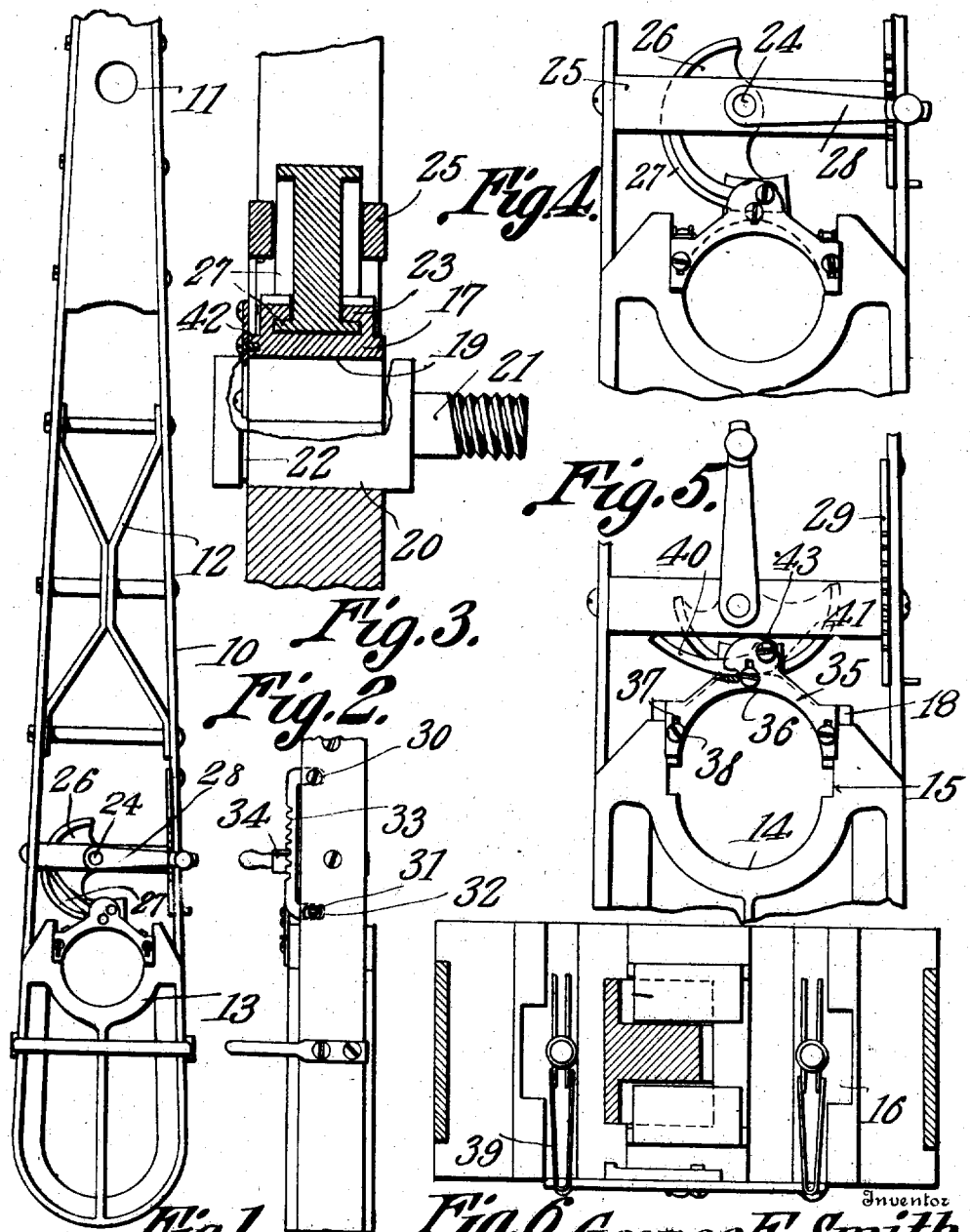

GEORGE E. SMITH, OF LOS ANGELES, CALIFORNIA, ASSIGNOR OF ONE-HALF TO GEORGE HESS, OF COALINGA, CALIFORNIA.

PITMAN.

973,715.  Specification of Letters Patent.  Patented Oct. 25, 1910.

Application filed February 14, 1910. Serial No. 543,698.

*To all whom it may concern:*

Be it known that I, GEORGE E. SMITH, a citizen of the United States, residing at Los Angeles, in the county of Los Angeles and State of California, have invented a new and useful Pitman, of which the following is a specification.

It is the object of the present invention to provide an improved construction of pitman, and while the improvements are directed chiefly to pitman construction, it will be understood from the description which is to follow and from an inspection of the accompanying drawings that the improvements may be directed equally well to other machine elements of like nature.

In well drilling machines, the pitman which is interposed between the driving crank and the walking beam must be disconnected from the crank many times in one day, and the present invention aims to so construct a pitman of this type that it may be readily connected to and disconnected from a crank pin without the employment of tools.

Inasmuch as it is desirable to connect and disconnect the pitman as rapidly as possible, the invention aims to so construct the present pitman that it does not require to be accurately adjusted upon the crank pin at the time of connection therewith.

Other novel features of the invention will be pointed out in the specific description which is to follow and will be taken from the accompanying drawings, in which, Figure 1 is a side elevation of a pitman constructed in accordance with the present invention. Fig. 2 is an edge view thereof illustrating only the lower portion. Fig. 3 is a vertical transverse sectional view taken on a vertical plane through the bearing for the crank pin. Fig. 4 is a detail view in side elevation of a portion of the pitman, the parts being shown in the position which they assume when the pitman is connected to the crank pin. Fig. 5 is a similar view but illustrating the parts in the position assumed when disconnected from the crank pin, and Fig. 6 is a horizontal sectional view taken on a plane directly above the bearing for the crank pin.

As illustrated in the drawings, the pitman embodies, in the structure of its lower end portion which is to be connected with the crank pin, a yoke 10 between the upper ends of the arms of which is received the lower end of a rod portion 11, the upper end of which (not shown) is to be connected to one end of the walking beam, heretofore mentioned or put under like machine elements to be driven from the crank pin. The arms of the yoke 10 are braced and held in proper spaced relation, at their intermediate portions, by suitable truss braces 12 which need not be specifically described as they form no part of the present invention.

It will be observed from an inspection of the several figures of the drawings that the lower portion of the yoke 10 is formed with an integral web, indicated by the numeral 13, and formed with a bearing concavity 14 which is substantially semi-cylindrical and is designed to partly receive the crank pin with which the pitman is to be connected. This bearing concavity 14 constitutes the bottom wall of a recess, the side walls of which are indicated by the numeral 15 and are located in parallel planes and in these side walls are formed guide grooves 16. A bearing block 17 is disposed between the side walls 15 and has ribs 18 fitting slidably in the grooves 16, it being understood that the block may be adjusted up or down with respect to the bearing concavity 14, and inasmuch as the under side of the block is formed with a bearing concavity 19, also semi-cylindrical, when the block is lowered, this concavity will register with the concavity in the web and a cylindrical bearing will be afforded for the crank pin. The crank pin is indicated in the drawings by the numeral 20 and is formed with a threaded stud portion 21, by means of which it may be fixed upon the ordinary crank disk and the pin is further formed with a circumscribing groove 22 located near its outer end. The block 17 is formed upon its upper face with upstanding oppositely located overhanging lugs 23 and secured upon a shaft 24 journaled in spaced bars 25 extending between the arms of the yoke, is an eccentric 26 formed with lateral flanges 27 which engage beneath the overhanging portions of the lugs 23. A crank handle 28 is also fixed upon the shaft 24 and it will be observed from inspection of Figs. 4 and 5 of the drawings that when the crank handle is swung down to about the position shown in Fig. 4, the eccentric will force down or lower the bearing block 17 and that on the other hand, when the said crank handle is swung up to about the position shown in Fig. 5, the eccentric will lift the block 17. It will further be understood that when the block is in the position shown in Fig. 4, a proper bearing is afforded the crank pin, but that when the block is in about the position shown in Fig. 5 of the drawings, the crank pin may be disengaged from the pitman, or vice-versa. Inasmuch as throughout one half of each cycle of movement of the crank pin, the same will bear upwardly against the block 17, it is expedient that some means be provided for securely holding the crank handle 28 against movement to the position to lift the said block, and this means is embodied in a rack bar 29 which at its upper end is rigidly secured, as at 30, to one arm of the yoke 10 and at its lower end carries a lateral stud 31 projecting through a slot 32 formed in the said arm, the said bar being formed in its outer edge with notches 33 in which a tooth 34 upon the crank handle is engageable interchangeably. By securing the bar rigidly at its upper end, but leaving its lower end free for limited movement, the bar will possess a degree of resiliency which will readily permit of movement of the tooth 34 over its notched edge, and it is even preferable that the lug 31 project beyond the arm through which the slot 32 is formed so that it may be manually engaged and moved in a direction away from the crank handle 28 whereby to release the same when it is desired to swing the crank handle upwardly.

The block 17, as will be presently described, carries means for engagement in the grooves 22 for the purpose of holding the pitman against becoming accidentally disengaged from the crank pin, and this means in the present instance is so constructed that an accurate adjustment of the pitman upon the crank pin when connected therewith, is not essential. The means above referred to is embodied in a plate 35, the lower edge of which is semi-circular and concaved, as at 36, and this plate is formed with a number of slots 37 through which project screws 38 upon the outer face of the block 17. As the slots 37 extend vertically, the plate 35 may be adjusted vertically upon the said block and when the plate is raised to about the position shown in Fig. 5, its concave semi-circular edge 36 will substantially register with the bearing concavity 19 in the block 17. When the plate is lowered, however, to about the position shown in Fig. 4 of the drawings, its said edge 36 will projet below the said bearing concavity and into the grooves 22. Wire springs 39 are secured upon the upper face of the block 17 and bear at their outer or free ends against the upper edge of the plate 35, one at each end thereof, and these springs serve to normally hold the plate in a downward direction whereby when the pitman is assembled with a crank pin, the bearing block 17 being lowered, it is only necessary to slide the pitman over the crank pin until the plate 35 seats in the groove 22, whereupon the operator may know that the proper adjustment has been secured. It is desirable that means be provided for automatically lifting the plate 35 when the crank handle 28 is swung up, and this means is embodied in a finger 40 having a cam under edge 41 which bears upon the cam surface of shoulder 42 upon the block 17, the finger being pivoted, as at 43, to the upper end of the plate 35 between the same and the adjacent one of the lugs 23. The extremity of the finger rides over the upper edge of the adjacent one of the cross bars 25 so that when the crank handle is swung up, the decreasing distance between the block 17 and the said cross bars 25 will cause the finger 40 to be depressed, thereby resulting in a lifting of the plate 35.

What is claimed is:

1. In a pitman or like machine element, a pillow block, a cap block mounted for sliding adjustment in the pillow block, said pillow block and cap block being constructed and arranged to afford bearings for a crank pin disposed between them, the cap block being provided with lugs overlying its upper face, and an oscillatory flanged eccentric arranged above the cap block and having its flange confined between the said overhanging lugs and said upper face of the cap block.

2. In a pitman or like machine element, bearing blocks, one relatively fixed and the other being adjustable with respect thereto, eccentrics whereby the adjustable block may be moved into or out of coöperative relation with respect to the fixed block, and means carried by the cap block and having positive engagement with the crank pin whereby to prevent displacement of the pitman with respect to the pin.

3. In a pitman or like machine element, bearing blocks, one relatively fixed and the other being adjustable with respect thereto, eccentrics whereby the adjustable block may be moved into or out of coöperative relation with respect to the fixed block, and spring actuated means carried by the cap block and having positive engagement with the crank pin whereby to prevent displacement of the pitman with respect to the pin.

4. In a pitman or like machine element, bearing blocks, one relatively fixed and the other being adjustable with respect thereto, eccentrics whereby the adjustable block may be moved into or out of coöperative relation with respect to the fixed block, and spring actuated, cam released means carried by the cap block and having positive engagement with the crank pin whereby to prevent displacement of the pitman with respect to the pin.

5. In a pitman or like machine element, a relatively fixed bearing, and an adjustable bearing block, eccentric means whereby the adjustable block may be lowered to coöperative relation with respect to the fixed block, the said bearings being designed to receive a crank pin formed with a circumscribing groove, a plate slidable upon the adjustable block, a spring tending to normally lower the plate, and a cam finger pivoted to the plate and having locking engagement with a fixed portion of the pitman.

In testimony that I claim the foregoing as my own, I have hereto affixed my signature in the presence of two witnesses.

GEORGE E. SMITH.

Witnesses:
CHAS. M. CRONKHILE,
UBALD CREPEAN.